Nov. 9, 1954  E. B. SCHREINER  2,694,022
METHOD OF CLEANING SEWERS AND THE LIKE
Filed Aug. 18, 1952

Edward B. Schreiner
INVENTOR.

United States Patent Office 2,694,022
Patented Nov. 9, 1954

2,694,022

METHOD OF CLEANING SEWERS AND THE LIKE

Edward B. Schreiner, Pella, Iowa

Application August 18, 1952, Serial No. 304,870

1 Claim. (Cl. 134—24)

The present invention relates to an improved method whereby a sewer line, pipe or an equivalent conduit may be successfully unclogged and freed of flow impeding obstructions. In carrying out the principles of the invention a stream of air under pressure is introduced into a column of water under pressure with the air entering the water column at right angles to the axis of flow of the water column. The means whereby this result is accomplished in a feasible and reliable manner has to do with a fire hose of a suitable diameter, said fire hose being provided at its leading end with a turbine-type nozzle and being provided intermediate its ends and at a point some distance from the nozzle with an air hose coupling. A relatively small air hose which delivers air under pressure is attached to the coupling and, as inferred, assumes a position at right angles to the axis of the coupling.

Briefly recited, the method pursued involves inserting a fire hose lengthwise into the accessible end of said conduit, providing the leading end of said fire hose with a rotary turbine-type nozzle, injecting and passing a column of pressured water through the hose to discharge from the latter by way of the radial jets on said nozzle, and delivering a stream of air under the pressure into the moving water column at right angles to the line of flow of said column, whereby the fire hose stiffens and floats in such water as is already in said conduit and, in addition, surges by the pulsations produced and propels the nozzle and hose forwardly.

The structural means which is preferably utilized for dislodging the obstruction, whatever it may be, and consequently unclogging the conduit comprises a water hose, for instance, a fire hose, a turbine nozzle attached rotatably to the leading end of said water hose, a coupling situated in the hose line and joining the adjacent end of complemental sections of said line together, said coupling having a side fitting which serves to accommodate the aforementioned air hose, said hose being relatively small in cross-sectional diameter compared to the diameter of the coupling and the full effect of the coupling and air hose being attained by providing the coupling with an air pressure gauge which is attached to the coupling at a place of vantage so that the air hose may be turned "on" and "off" as the existing conditions require.

Considered from another point of view, the concept has to do with a rigid hose coupling having means at opposite ends for the attachment thereto of complemental fire hose sections, said coupling being of a cross-sectional diameter corresponding to said fire hose sections and having a relatively small screw-threaded air inlet opening in one side intermediate the ends of the coupling, and a correspondingly small air hose having screw-threaded coupling means joined to said coupling by way of said inlet opening.

Other objects, features and advantages will become more readily apparent from the following description and the accompanying sheet of illustrative drawings.

In the sheet of drawings wherein like numerals are employed to designate like parts throughout the views.

Figure 1:
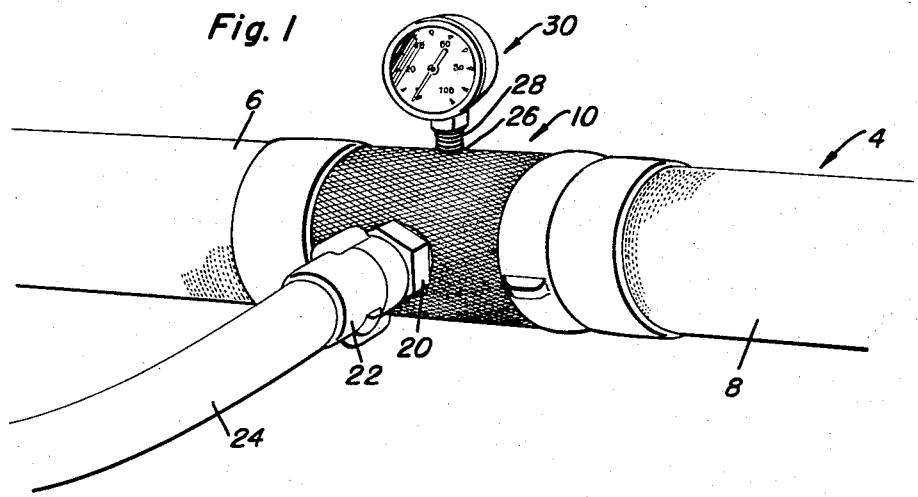
Figure 1 is a fragmentary perspective view showing the complete structural means employed in cleaning out a pipe line, sewer or equivalent conduit.
Figure 2:
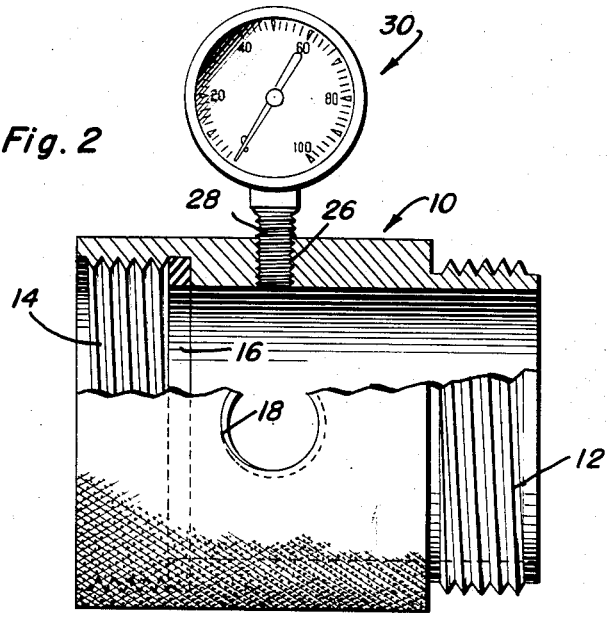
Figure 2 is a view in section and elevation of the coupling with the gauge attached.
Figure 3:
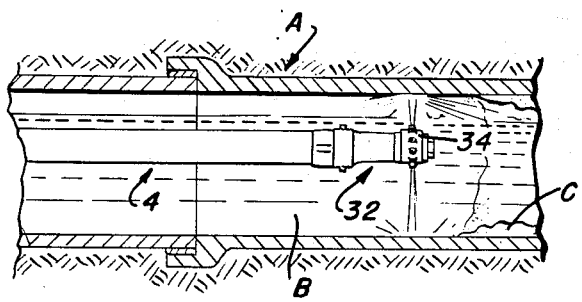
Figure 3 is a view in section and elevation showing the manner in which the nozzle-equipped-end of the fire hose propels itself forwardly as the obstruction is loosened and flushed out of the conduit.

With reference to Figure 3 the so-called conduit here takes the form of a sewer or an equivalent pipe or line which is denoted at A, the water therein being denoted at B and the obstruction which is to be dislodged by loosening and then flushed out is denoted at C.

The water hose takes the form of a fire hose of suitable length and diameter and this is generally denoted by the numeral 4. Two sections are shown and these are denoted by the numerals 6 and 8. They are interconnected by the improved coupling means. This is a simple coupling and is denoted by the numeral 10 and is of rigid metal and preferably has a knurled surface. It is of a diameter corresponding to the inside diameter of the fire hose. At one end is an externally screw-threaded male coupling neck 12 which joins to the section 8. The female coupling neck is denoted at 14 and is joined across with the section 6. The numeral 16 denotes the packing ring. In one side is a small diametered screw-threaded hole 18 into which an appropriate fitting 20 is tapped and this serves to accommodate an attaching coupling 22 carried by the relatively small air hose 24. It is to be noted, of course, that the air enters the coupling 10 by way of the inlet opening 18 at right angles to the axis of said coupling. In the top of the coupling is a small screw-threaded hole 26 into which the shank 28 of the air pressure gauge 30 is threadedly fitted.

With further reference to Figure 3, the fire hose nozzle is denoted as a unit by the numeral 32 and it is here provided with a rotatable nozzle equipped ring 34, said nozzle, as a whole, constituting the aforementioned turbine.

As stated the purpose of the device is to make feasible the introduction of air under pressure into a fire hose stream that can be used in conjunction with any or all now existing turbine nozzles commonly used for cleaning out obstructions from a conduit or sewer line as shown in the drawings. It might be mentioned here that the means displayed may also be used with any turbine nozzle to carry air tools up to the point of obstruction to facilitate their removal at a distance that is greater than is ordinarily satisfied by known methods employed by others.

In practice, air under pressure is introduced into the fire hose line after the water has been turned on for a short time and this causes the hose to stiffen and float, thereby reducing the skin friction of the hose with the pipe, tile or sewer line being cleaned, thereby making penetration of the clogged line to a much greater depth possible, 400 to 500 feet or more, depending upon the amount of water pressure and air pressure and the amount of air admitted. The air is at all times under the control of the operator, air being admitted through the hose 24 through the ¼ inch size opening 18 in the coupling which is at a 90° angle with the water stream, causing the hose to pulsate or move back and forth with a ramming action, which is so necessary in this kind of work.

From a standpoint of structure, the apparatus or means herein disclosed and utilized is comparatively simple, economical, practical and reliably resultful in use. The particular construction employed likewise makes practical and successful the method steps herein revealed and pursued. It is believed, therefore, that the disclosure is sufficient to enable the reader to fully understand the purposes and accomplishments of the invention.

Having described the invention, what is claimed as new is:

The herein described method of cleaning a water sewer conduit comprising injecting a column of water under pressure through a flexible hose extending longitudinally in the conduit, causing the column of water to discharge from said hose into said conduit in a whirling spray, and causing said hose to float and to pulsate longitudinally in the water in the conduit by introducing air under pressure into the column of water.

References Cited in the file of this patent

UNITED STATES PATENTS

| Number | Name | Date |
|---|---|---|
| 738,208 | Lawler | Sept. 8, 1903 |

(Other references on following page)

UNITED STATES PATENTS

| Number | Name | Date |
|---|---|---|
| 963,248 | Ramelli | July 5, 1910 |
| 987,226 | Fritz | Mar. 21, 1911 |
| 1,141,243 | Foster | June 1, 1915 |
| 1,274,931 | Otterson | Aug. 6, 1918 |
| 1,298,973 | Leahy | Apr. 1, 1919 |
| 1,566,958 | Gill | Dec. 22, 1925 |
| 1,865,289 | Trowbridge | June 28, 1932 |
| 1,887,985 | Auker | Nov. 15, 1932 |
| 2,276,131 | Wiant | Mar. 10, 1942 |
| 2,418,045 | Neider | Mar. 25, 1947 |
| 2,526,265 | Nulph | Oct. 17, 1950 |
| 2,563,130 | Mylchreest | Aug. 7, 1951 |
| 2,577,664 | Pro | Dec. 4, 1951 |
| 2,584,845 | Crawley | Feb. 5, 1952 |
| 2,622,605 | Brooks | Dec. 23, 1952 |